US012442730B2

(12) United States Patent
Brals et al.

(10) Patent No.: US 12,442,730 B2
(45) Date of Patent: Oct. 14, 2025

(54) DISSECTION APPARATUS

(71) Applicant: Xyall B.V., Eindhoven (NL)

(72) Inventors: Albert Brals, Beek en Donk (NL);
Antonius Henricus Bernardus Maria Koppen, Nuenen (NL); Edwin Johannes Richardus Wilhelmus Thijssen, Oeffelt (NL); Thomas Patrick Anne-Lise Lembrechts, Eindhoven (NL)

(73) Assignee: Xyall B.V., Eindhoven (NL)

( * ) Notice: Subject to any disclaimer, the term of this patent is extended or adjusted under 35 U.S.C. 154(b) by 968 days.

(21) Appl. No.: 17/621,066

(22) PCT Filed: Jun. 15, 2020

(86) PCT No.: PCT/EP2020/066495
§ 371 (c)(1),
(2) Date: Dec. 20, 2021

(87) PCT Pub. No.: WO2020/254250
PCT Pub. Date: Dec. 24, 2020

(65) Prior Publication Data
US 2022/0326124 A1    Oct. 13, 2022

(30) Foreign Application Priority Data
Jun. 18, 2019    (EP) .................................. 19180836

(51) Int. Cl.
*G01N 1/28* (2006.01)
*G01N 1/08* (2006.01)
(52) U.S. Cl.
CPC .............. *G01N 1/286* (2013.01); *G01N 1/08* (2013.01); *G01N 2001/2873* (2013.01)
(58) Field of Classification Search
CPC ... G01N 1/286; G01N 1/08; G01N 2001/2873
See application file for complete search history.

(56) References Cited

U.S. PATENT DOCUMENTS

| | | | |
|---|---|---|---|
| 6,673,086 B1 * | 1/2004 | Hofmeier | C12M 45/02 606/169 |
| 2003/0032861 A1 * | 2/2003 | Lunsford | A61B 17/0218 600/209 |

(Continued)

FOREIGN PATENT DOCUMENTS

| | | |
|---|---|---|
| EP | 3245069 B1 | 9/2018 |
| JP | 2012208234 A | 10/2012 |

(Continued)

OTHER PUBLICATIONS

Mar. 5, 2024 Japanese Office Action.
International Search Report and Written Opinion for PCT Patent App. No. PCT/EP2020/066495 (Sep. 4, 2020).

*Primary Examiner* — Jill A Warden
*Assistant Examiner* — Alex Ramirez
(74) *Attorney, Agent, or Firm* — Whitestone Law, PLLC

(57) ABSTRACT

Some embodiments are directed to a dissection tool for mechanical removal of biological material from a tissue sample on a planar substrate, such a glass slide including a platform for supporting the glass slide and a positioning system configured to move the dissection tool and platform relative to each other and control their relative positions. The dissection tool has a longitudinal axis and is arranged at an oblique angle relative to the platform and a thin-walled gouging head that has a base portion. The gouging head includes opposing side portions which extend from the base portion in a direction away from the glass slide and which at least partly enclose a cavity within the gouging head for receiving biological material that is dissected when relative movement between the platform and the dissection tool causes a front face of the gouging head to gouge a track though the tissue sample.

12 Claims, 4 Drawing Sheets

(56) References Cited

U.S. PATENT DOCUMENTS

| | | | |
|---|---|---|---|
| 2006/0134600 A1* | 6/2006 | Fuhr | G01N 15/12 |
| | | | 435/4 |
| 2012/0045790 A1 | 2/2012 | Van Dijk et al. | |
| 2012/0179150 A1* | 7/2012 | Whayne | A61B 18/1492 |
| | | | 606/49 |
| 2015/0262329 A1 | 9/2015 | Vink et al. | |
| 2016/0131559 A1 | 5/2016 | Wimberger-Friedl et al. | |
| 2017/0116734 A1 | 4/2017 | Van Leeuwen et al. | |
| 2018/0136091 A1 | 5/2018 | Ryan et al. | |
| 2018/0225872 A1 | 8/2018 | Vink et al. | |
| 2018/0267290 A1 | 9/2018 | Boamfa et al. | |

FOREIGN PATENT DOCUMENTS

| | | |
|---|---|---|
| WO | 2012102779 A2 | 8/2012 |
| WO | WO2015/018750 A1 | 2/2015 |
| WO | 2016009862 A1 | 1/2016 |

* cited by examiner

DISSECTION APPARATUS

CROSS REFERENCE TO RELATED APPLICATIONS

This application is a national phase filing under 35 C.F.R. § 371 of and claims priority to PCT Patent Application No. PCT/EP2020/066495, filed on Jun. 15, 2020, which claims the priority benefit under 35 U.S.C. § 119 of European Patent Application No. 19180836.9 filed on Jun. 18, 2019, the contents of each of which are hereby incorporated in their entireties by reference.

BACKGROUND

Some embodiments of the presently disclosed subject matter relate to an apparatus for automated dissection of material from a biological sample disposed on a planar substrate.

A method and device for the separation of material from a region of interest (ROI) in a biological sample is disclosed in US 2016/0131559. A cover sheet provided with a shaped aperture is applied to the sample, such that the aperture provides access to the ROI and the remainder of the sample is shielded. An extraction procedure such as lysing is then applied to remove sample material from the unshielded ROI.

A further example of device for extracting material from a biological sample is disclosed in WO 2012/102779. The device includes an extraction tool, which has a rotating cutting tip for disrupting material from a region of the sample and a liquid dispensing port and a liquid aspiration port, located in close proximity to the cutting tip. The device is configured such that liquid is dispensed at the cutting tip and such that disrupted material and dispensed liquid are aspirated via the aspiration port into the extraction device.

There is still room for improvement in terms of defining an apparatus for automated dissection of biological material which is of straightforward construction and enables efficient and reliable removal of material, with minimal cross-contamination.

SUMMARY

Some embodiments of the presently disclosed subject matter resides in an apparatus as defined in claim 1, whereby the dependent claims specify optional, additional features.

Specifically, some embodiments of the apparatus of the presently disclosed subject matter includes a dissection tool for mechanical removal of biological material from a tissue sample or biological sample disposed on a planar substrate, such as a glass slide. The apparatus further includes a platform for supporting the glass slide or any other substrate and a positioning system configured to move the dissection tool and the platform relative to each other and control their relative positions such that the dissection tool selectively engages with the sample in a predefined region.

The dissection tool has a longitudinal axis and is arranged at an oblique angle relative to the platform. The tool further includes a thin-walled gouging head that has a base portion, an underside of which engages with the planar substrate when the gouging tool is in use. The gouging head also has opposing side portions which extend from the base portion in a direction away from the planar substrate and which at least partly enclose a cavity within the gouging head for receiving biological material that is dissected when relative movement between the gouging head and the planar substrate causes a front face of the gouging head to cut a track though the biological sample.

In a most basic form, the gouging head resembles a shovel and may have an essentially flat base portion and upstanding side portions. When the underside of the base portion is in contact with the planar substrate (slide), relative movement, which brings a front face of the gouging head into contact with the biological sample, causes material from the tissue sample to be scraped off/gouged off. A section of the upstanding sides also makes contact with the biological sample, in a gouging zone, and provides a cutting function that improves reliability of material removal by preventing flaking of the biological material or preventing it from turning aside. The upstanding sides also help to guide the gouged material into the cavity of the gouging head.

In other embodiments, the base portion and side portions of the gouging head have curved surfaces in circumferential direction relative to the longitudinal axis of the dissection tool. For example, the gouging head may be formed by a thin-walled tube.

The dissection tool has a body portion that may be essentially tubular in form. The gouging head may be integrally formed with the body of the dissection tool or may be a separate part that is attached to one end of the body portion. In one example, the gouging head is formed by a collar made of metal foil that is attached to the body portion. The metal foil may have a thickness of between 30 and 60 microns.

The underside of the base portion of the gouging head makes contact with the planar substrate on which the biological sample is disposed. Possibly, the apparatus is equipped with a linear actuator for varying a downward force that is exerted on the gouging head, such that the contact pressure between the head and the planar substrate can be controlled during dissection. This is beneficial in terms of optimising cutting performance.

In an embodiment, the positioning system includes a linear actuator for adjusting a vertical position of the gouging head relative to the platform. For example, the dissection tool may be mounted to a motorized linear actuator, whereby a controller of the positioning system is configured to adjust the vertical position of the tool and thereby vary the applied contact pressure between the gouging head and the planar substrate.

In a further development of some embodiments of the presently disclosed subject matter, the dissection apparatus is configured to enable variation of the width of the track cut through the biological sample during dissection. This improves the efficiency of the apparatus, by enabling the selection of a relatively large width for relatively greater material removal in an area of the sample where precision is not vital. Close to the boundary of a region of interest in the biological sample, where greater precision can be required, a narrower width can then be selected.

The positioning system suitably includes a translation stage for moving the gouging head relative to the platform in a linear translation direction T. When the longitudinal axis of the dissection tool is parallel to the translation direction, the front face of the gouging head has a maximum width in contact with the tissue sample and the gouging zone is at its widest. The width can be reduced by positioning the gouging head such that the longitudinal axis is at an angle relative to the translation direction.

In one embodiment of the further development, the dissection tool is mounted to the apparatus so as to be rotational about an axis normal to the platform, to enable angular adjustment of the gouging head between an angle of 0 degrees, in which the longitudinal axis is parallel to the translation direction, and an angle θ<90 degrees. The reduction in width is proportional to the increase in angular orientation.

The positioning system may be equipped with manual adjustment means for adjusting the angular orientation of the gouging head relative to the translation direction or with motorized rotary actuator controlled by the positioning system controller. The positioning system may thus be programmed with an algorithm that controls track width depending of the shape of the region to be dissected.

In an alternative embodiment, wherein an outer periphery of at least the base portion and opposing side portions of the gouging head is curved in circumferential direction relative to the longitudinal axis, track width is controlled by varying the curvature of at least the base portion.

In one example, the gouging head is flexible. It may be formed by a collar made of steel foil such as described above. The apparatus is equipped with a linear actuator for varying the downward force applied on the flexible gouging head, such that controlled deformation of the base portion can be achieved. Increasing the contact pressure between the base portion and the planar substrate flattens the curvature of the base portion, enabling the width of the gouging zone and the corresponding track width to be varied.

In a further example, the apparatus is configured to adjust the width of the gouging zone by using a gouging head which has different curvatures at its outer periphery. The gouging head has a first portion with a first radius of curvature $r_1$ and has at least one further portion with a second radius of curvature $r_2$, different from the first. In one example, the gouging head has an elliptical cross-section. In a further example, the gouging head has an egg-shaped cross-section.

Suitably, the dissection tool is mounted to the apparatus so as to be rotational about the longitudinal axis and the positioning system includes a rotary actuator for adjusting an angular position of the gouging head such that the first portion of the gouging head (with radius of curvature $r_1$) or the at least one further portion may serve as the base portion of the gouging head. In the case of an elliptical shape, for example, a narrow section of the ellipse will gouge a narrower track through the tissue sample than if a broader section forms the base portion. The controller of the positioning system may be programmed such that when removing material close to a boundary between material of the tissue sample to be diagnosed and material not to be diagnosed, the gouging head is rotated to a position that results in a narrow gouging zone for optimal precision. In other areas, remote from the boundary, the controller may be configured to rotate the gouging head to a position that results in a wider gouging zone, enabling the speed and efficiency of the material dissection process to be optimized.

Suitably, the positioning system includes motorized actuators for relative movement in transverse X and Y directions and possibly also for relative movement in the vertical direction Z. In some embodiments, the positioning system further includes a rotation stage for adjusting a position of the platform (and biological sample) relative to the gouging head about a rotation axis that is perpendicular to the planar substrate. The actuators may be coupled to the platform, for moving the biological sample relative to the dissection tool and/or the actuators may be coupled to the dissection tool for moving the gouging head relative to the sample.

As mentioned, the dissection tool is arranged at an oblique angle relative to the platform. The angle of engagement may lie between 30 and 60 degrees, although other angles may be desirable depending on the nature of the biological sample being dissected.

In a further development, the dissection tool is pivotably mounted to the apparatus to enable adjustment of the engagement angle. The apparatus may be equipped with manual adjustment means or with motorized angular adjustment means controlled by the positioning system controller.

Possibly, the apparatus includes an imaging system for obtaining an image of the biological sample. Suitably, the imaging system is configured to identify the boundary between a region of interest containing biological material to be tested and an unwanted area containing material not to be tested. In other words, the imaging system identifies the shape of the region that is to be dissected. In some examples, the biological sample is a stained tissue sample and the imaging system simply recognizes the stained region. In other examples, the imaging system may be programmed with software to process a captured image of the tissue sample and identify the region of interest based on e.g. cell structure. The system may also be configured to identify the shape of the region to be dissected by comparing the captured image with a reference image that has been marked by a pathologist. The imaging system may also be configured to capture an image after dissection.

Suitably, the positioning system is configured to control the relative position of the platform and the dissection tool based on the boundary identified by the imaging system. The dissection process may involve causing the dissection tool to gouge several adjacent tracks though the tissue sample, to remove and collect material from the region of interest or to remove and collect material from the unwanted area, leaving the material to be tested on the slide.

Advantageously, in embodiments where the apparatus is configured to enable the width of the gouging zone to be varied, the positioning system is further configured to control the width of the gouging zone based on the shape of the region to be dissected identified by the imaging system.

The gouged tracks through the biological sample may follow a straight path, a curved path or a mixture of the two, until all or substantially all of the gouged material has been dissected from the slide Prior to the dissection process in which biological material is gouged from the planar substrate and collected within the dissection tool, it can be advantageous to physically detach the material in the region of interest from the material in the unwanted area, while all or most tissue remains attached to the planar substrate. In a further development, some embodiments of the apparatus of the presently disclosed subject matter includes a device for automated detachment/scoring of the tissue material. The positioning system is then suitably configured to control the relative position of the platform and the device such that detachment or scoring takes place along the boundary identified by the imaging system. In one example, the device includes a knife or a rolling knife. In a further example, the device includes a laser beam which may be directed at the identified boundary.

The apparatus may also be configured such that the gouging head is used to detach the material in the region of interest from the material in the unwanted area. A first step in the dissection process may include controlling the relative movement of the platform and the dissection tool such that the gouging head engages with the tissue sample at the boundary identified by the imaging system, prior to further dissection of material as described above.

During the gouging process, the removed material accumulates. Initially gouged material is displaced farther within the gouging head cavity by subsequently gouged material. An inner surface of the gouging head may be coated with a low-friction material, to promote the displacement of gouged material into the cavity. An outer surface of the gouging head may also be provided with a low-friction coating, to reduce the frictional contact between the head and the planar substrate.

In a further development, the apparatus is equipped with a suction device, to ensure that all or most gouged material is removed from the planar substrate. In one example, the suction device is an aspiration device such as disclosed in WO 2012/102779. In an exemplary embodiment, a body portion of the dissection tool is connected to a vacuum pump, such that air flows through the dissection tool. The gouging head may thus simultaneously serve as a mechanical cutter and a suction nozzle, which has the further advantage of reducing the likelihood of cross-contamination between material in the region of interest and material in the unwanted area.

In a still further development, the apparatus is equipped with an air ionizer. Contact between the underside of the gouging head and the planar surface on which the biological material is disposed produces friction, which can lead to a build up of static change on the biological material. The air ionizer conditions the air flowing around the gouging head, and thus reduces any build-up of static charge that could adversely affect the collection of biological material during dissection.

It will be appreciated by one of ordinary skill in the art that two or more of the above-mentioned embodiments, implementations, and/or aspects of the presently disclosed subject matter may be combined in any way deemed useful.

BRIEF DESCRIPTION OF THE DRAWINGS

The presently disclosed subject matter will now be further elucidated with reference to the embodiments described hereinafter. In the drawings, FIG. 1a schematically shows an apparatus for dissection of material from a tissue sample according to a first embodiment of the presently disclosed subject matter;

FIG. 2b shows a front face of a gouging head used in the apparatus of FIG. 2a;

It should be noted that items which have the same reference numbers in different figures, have the same structural features and the same functions, or are the same signals. Where the function and/or structure of such an item has been explained, there is no necessity for repeated explanation thereof in the detailed description.

DETAILED DESCRIPTION OF EXEMPLARY EMBODIMENTS

Pathology diagnostic investigation of biological material, such as tissue and cells, forms the basis for many treatment decisions, particularly in oncology. For example, genomic-based tests are performed in order to determine the effectiveness of treatment for individual patients diagnosed with cancer. The biological material/tissue may be obtained from a biopsy and is then, for example, embedded in paraffin and cut into thin slices which are fixed onto glass slides. These thin slices will be referred to as tissue samples. Other methods of preparing tissue samples are known.

The tissue sample has a region of interest ROI containing material that is to be subjected to the diagnostic testing. The ROI can be identified by staining, or a pathologist may provide markings on a reference slide after analysis under a microscope. The ROI can also be identified via processing of a digital image of the sample. When the ROI has been identified, material is removed/dissected from the slide.

Figure 1A:
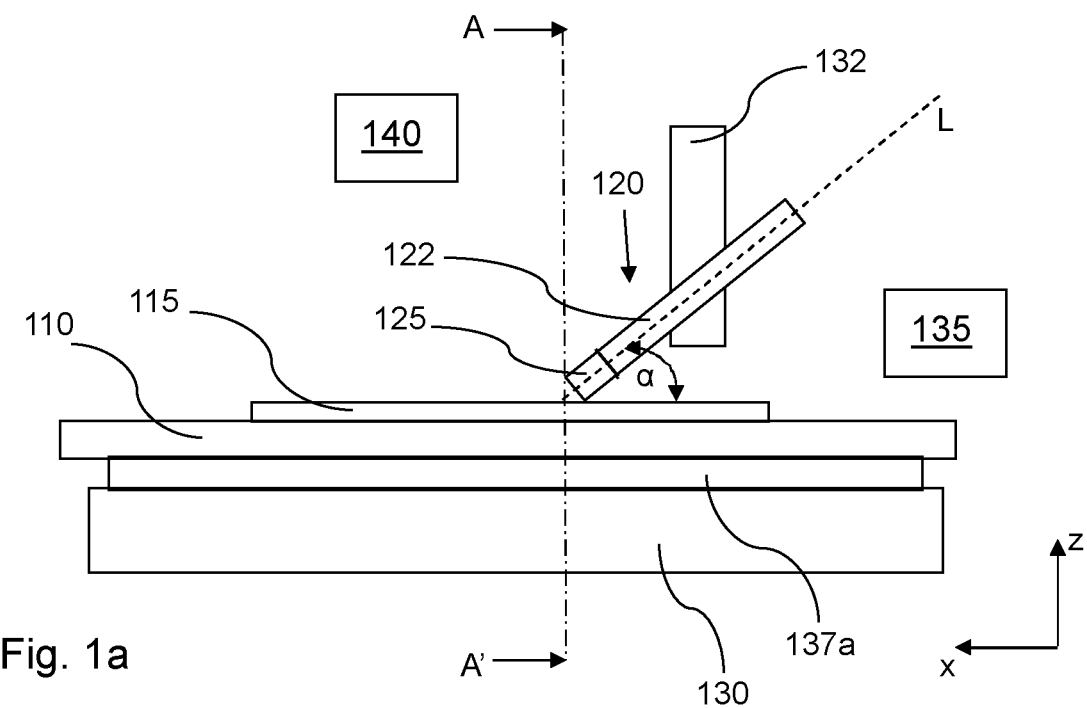
FIG. 1b shows a top view of a tissue sample disposed on a slide.
FIG. 1c shows a front face of a gouging head of the dissection apparatus in engagement with the slide and tissue sample, in a first position.
FIG. 1d, shows a front face of the gouging head in engagement with the slide and tissue sample, in a second position, in which a greater contact pressure is applied on the gouging head.
Figure 1B:
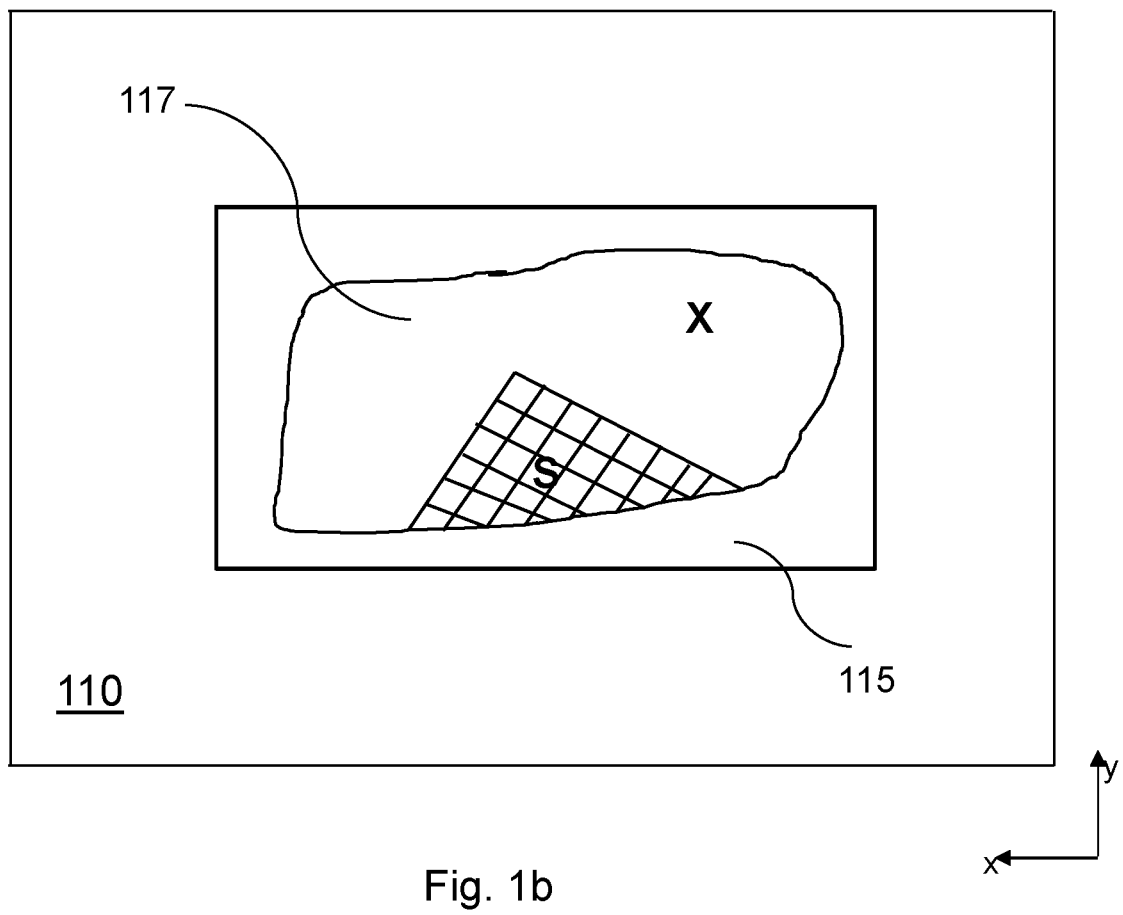

FIG. 1a schematically shows parts of an apparatus for dissection according to an embodiment of the presently disclosed subject matter. The apparatus 100 includes a platform 110 for supporting a slide 115 on which a tissue sample 117 is disposed. A top view of the platform and slide is shown in FIG. 1b. The tissue sample 117 includes a region of interest containing material to be diagnosed, indicated with reference S, and an unwanted area, indicated with reference X. Possibly, only material from the ROI can or should be included in the diagnostic tests, meaning that this material S needs to be separated from the material in the unwanted area X. This can be done either by dissecting and removing substantially all or most material in the ROI from the slide, or by dissecting and removing substantially all or most material in the unwanted area X, leaving the material to be diagnosed S on the slide.

Removal is performed using a dissection tool 120, which is mounted to a housing (not shown) of the apparatus. The dissection tool 120 includes a gouging head 125 that is arranged to mechanically engage with the tissue sample 117 and scrape off the material to be removed. The dissection tool has a longitudinal axis L, and is arranged at an oblique angle α relative to a planar surface of the platform 110, whereby α may typically lie between 30 and 60 degrees, although other angles are possible. Possibly the dissection tool is pivotably mounted to the housing, so that the angular orientation of the tool relative to the platform can be adjusted.

In the depicted embodiment, the dissection tool includes a tubular body 122 and has a thin-walled gouging head 125 in the form of a collar made of metal foil, which is attached to a peripheral end of the tubular body. A wall-thickness of the gouging head is defined by the thickness of the metal foil, which may be a steel foil with a thickness of e.g. 30-60 μm.

The apparatus 100 is further equipped with a positioning system for moving the platform 110 and the dissection tool 120 relative to each other. The positioning system enables transverse relative movements in X and Y direction. In the depicted embodiment, the positioning system has a motorized X-Y stage 130 coupled to the platform 110. In other embodiments, the dissection tool is mounted to an X-Y stage. Possibly, the positioning system further includes a Z-stage for enabling relative movement in vertical direction Z and is controllable in order to vary the downward force with which the gouging head 125 is pressed against the slide. In the depicted embodiment, the dissection tool 120 is mounted to the apparatus housing via a motorized Z-stage 132 for varying the vertical position or height of the tool relative to the platform. Alternatively, the apparatus may be equipped with manual height adjustment means. The positioning system possibly also includes a rotation stage 137a for adjusting the angular position of the platform 110 relative to the dissection tool around a rotation axis R normal to platform.

Let us assume that the apparatus is configured to remove material from the region of interest S. The positioning system includes a controller 135 for controlling the relative movement of the platform 110 and the dissection tool, such that the gouging head 125 engages with the tissue sample 117 only in the identified region of interest S in this embodiment. Suitably, the apparatus is equipped with an imaging system 140 for identifying the region of interest and communicating its coordinates to the controller 135.

Figure 1C:
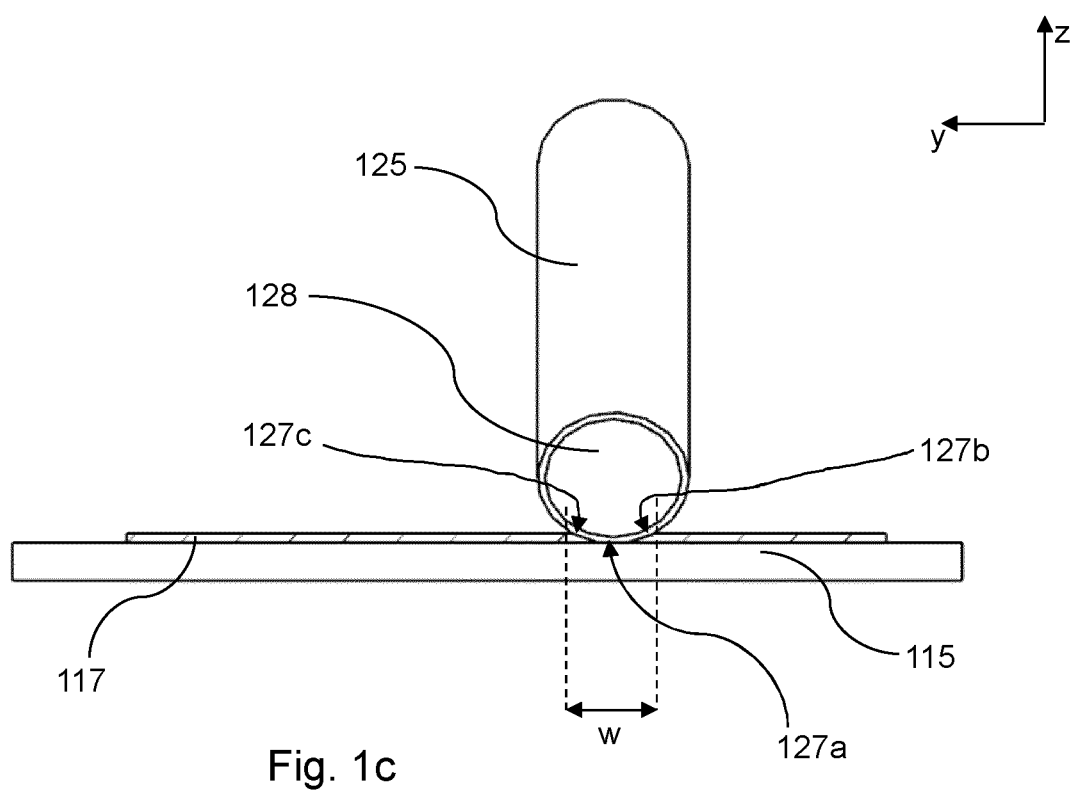

When material removal is to begin, the vertical position of the dissection tool 120 is adjusted such that a base portion of the gouging head 125 makes contact with a top surface of the slide 115. A cross-sectional view of the gouging head and slide, taken through line A-A' in FIG. 1a, is shown in FIG. 1c. The gouging head formed by the metal foil collar has an essentially circular cross-section in this example. When the base portion 127a of the head is in contact with the slide top surface, a front face of the gouging head is also in contact with the tissue sample 117 in a gouging zone, formed by the base portion 127a and opposing side portions 127b, 127c of the gouging head in the region of contact. Thus, when relative movement occurs in the X-direction, material from the tissue sample is scraped off the slide 115 into a cavity 128 of the gouging head, whereby the opposing side portions 127b, 127c cut a track through the material and guide the gouged material into the cavity 128. The track cut through the tissue sample 117 has a width w, corresponding to a width of the gouging zone, and has precisely defined edges. In other words, minimal flaking occurs which is advantageous in terms of collecting all or most the material that needs to be collected and preventing cross-contamination when removing material close to a boundary zone between the region of interest S and the unwanted area X. Suitably, the positioning system controller 135 is configured to control the relative movement between the platform 110 and the dissection tool 120, such that the gouging head 125 cuts several tracks through the region of interest S until all or substantially all material has been removed and collected within the cavity 128 of the gouging head.

The width w of the tracks cut through the tissue sample is dependent on the width of the gouging head, which in turn depends on a radius of curvature of the gouging head in the gouging zone.

Figure 1D:
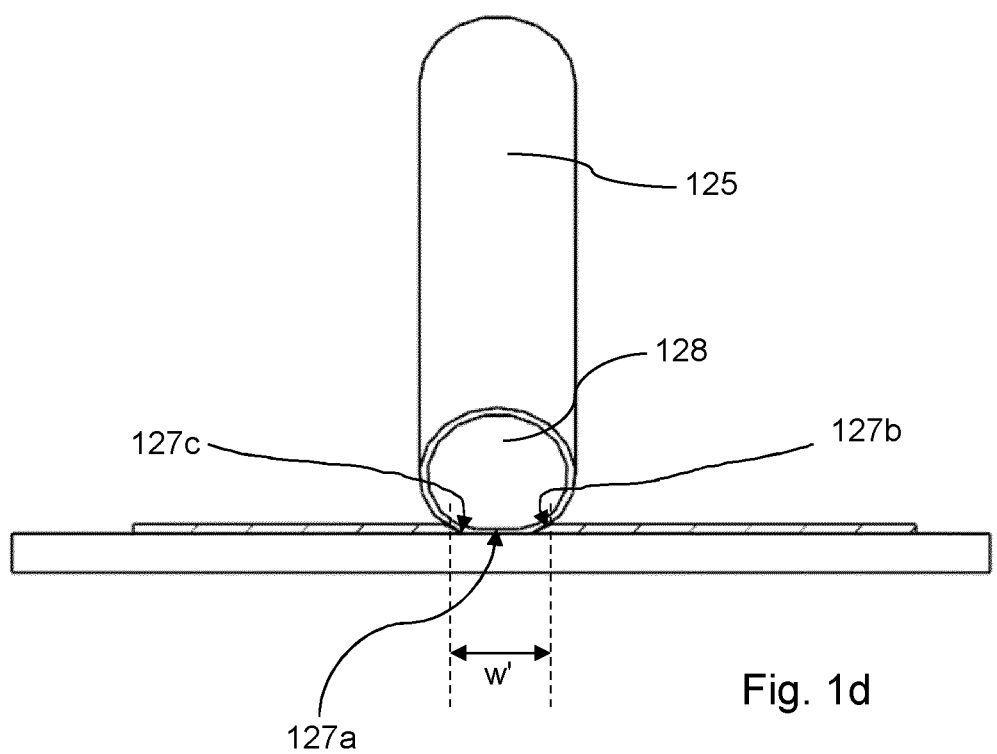

In a further development, the apparatus is configured such that the width of the gouging zone can be varied. The gouging head 125 is formed by a collar made of metal foil in the currently described embodiment. The gouging head is therefore flexible and can be deformed by increasing a contact pressure with which the head is pressed against the slide 115, by controlling the vertical position of the head relative to the slide and varying the applied downward force. FIG. 1d shows the gouging head in a lower position relative to the position shown in FIG. 1c. The base portion 127a has been somewhat flattened and the opposing side portions 127b, 127c in the gouging zone are also less curved. As a result, the width w' of the gouging zone and of the produced track is greater.

In the position depicted in FIG. 1c, the undeformed circular gouging head 125 produces the narrowest track width w through the tissue sample 117. This position is thus most suitable for use when removing material at or near the boundary zone between the unwanted material X and the material to be diagnosed S. When removing material in a region that is remote from the boundary zone, less precision may be required and a wider gouging head, such as shown in FIG. 1d, enables more material to be removed, thus increasing the speed and efficiency of the process. The controller 135 is thus suitably programmed to adjust the vertical position of the slide 115 relative to the gouging head 125 to achieve a desired gouging width via controlled deformation of the flexible gouging head.

The dissection process includes physically detaching the material to be diagnosed S from the unwanted material at the boundary of the ROI. This can be done using the gouging head. Suitably, a head with a narrow gouging zone is then used. Detachment can also be carried out prior to material removal. This is typically referred to as scoring, and may be performed automatically or manually using e.g. a rolling knife. Scoring can also be performed by scanning the ROI boundaries with laser light. In an example, light with an intensity that causes local evaporation of the tissue is used. Material removal is then performed using the dissection tool.

Figure 2A:
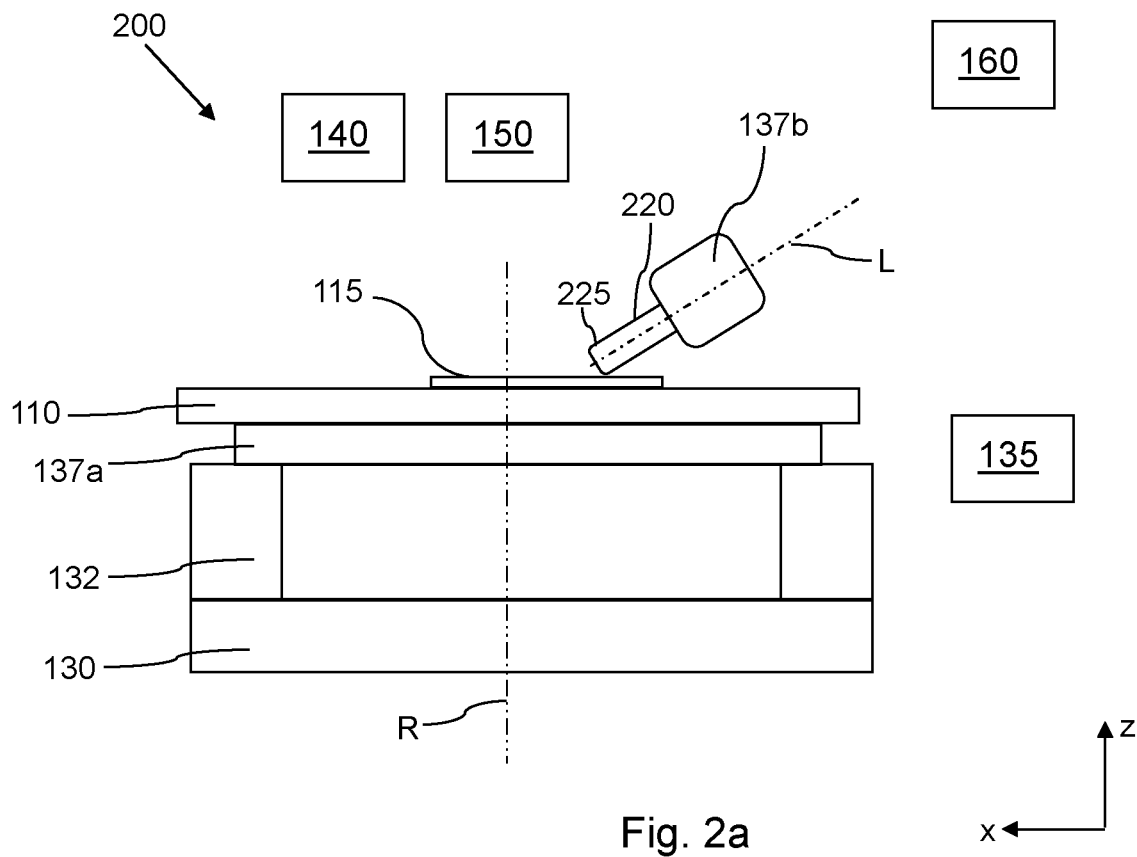
FIG. 2a schematically shows an apparatus for dissection of material from a tissue sample according to a further embodiment of the presently disclosed subject matter.

A further example of an apparatus according to the presently disclosed subject matter is shown schematically in FIG. 2a. The apparatus 200 again has a dissection tool 220 with a longitudinal axis L arranged at an oblique angle relative to a platform 110 for supporting a slide 115 with a tissue sample. The platform 110 is coupled to a positioning system having a controller 135, an X-Y stage 130 for translational adjustments and a Z-stage 132 for vertical adjustments. In addition, the platform 110 is rotational about a rotation axis R. The positioning system thus includes a rotating stage 137a for adjustment of an angular position of the slide 115 relative to the dissection tool 220, which is likewise adjusted via the controller 135.

The apparatus 200 again includes an imaging system 140 for obtaining an image of the tissue sample and identifying the region of interest, and additionally includes a scoring device 150, which in the depicted example includes a laser beam and a tiltable mirror for directing the laser beam towards the boundary between the region of interest, identified by the imaging system 140, and the unwanted area. Suitably, the controller 135 of the positioning system is configured to control the movement of the platform 110 and the tiltable mirror such that the laser beam scores the boundary of the ROI, to detach it from the unwanted area of the tissue sample via local evaporation.

Figure 2B:
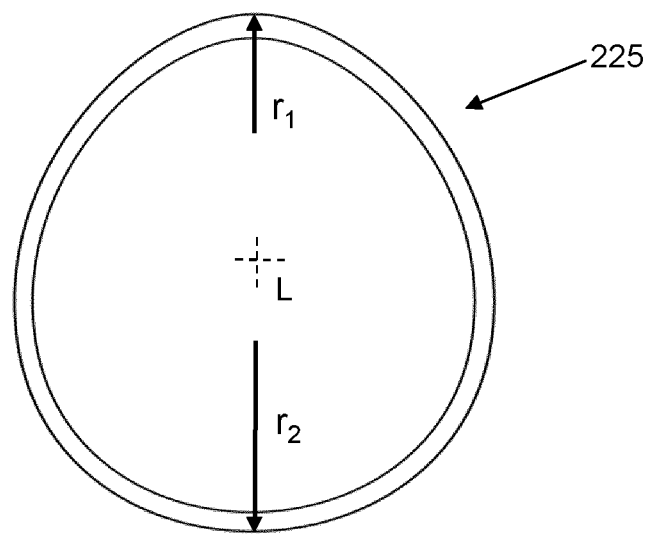

The dissection tool 220 in this embodiment has a thin-walled gouging head 225, with a wall thickness of e.g. 0.3-0.5 mm, that is integrally formed with a generally tubular body. The body and head may be made from a suitable polymer material. A front face of the gouging head 225 is shown in FIG. 2b. In this example, a distance between the longitudinal axis L of the dissection tool 220 and an outer diameter of the thin-walled gouging head varies around its periphery, such that locally, the gouging head includes portions with varying radius of curvature. In the case where the gouging head is oriented such that the portion with smallest radius of curvature $r_1$ forms the base portion of the gouging head (which makes contact with the slide top surface), the gouging zone is at its narrowest. If the gouging head is oriented such that the portion with radius of curvature $r_2$ forms the base portion, whereby $r_2 > r_1$, the gouging zone will be relatively wider.

As explained with reference to the first embodiment, the width of the track that is cut through the tissue sample during the material removal process is governed by the width of the gouging head in the gouging zone, which in turn depends on the radius/radii of curvature in that region.

In this embodiment, the gouging head formed from a polymer material is not sufficiently flexible to enable he curvature to be flattened by applying more contact pressure, but as will be understood, the width of the gouging zone can be varied by rotating the gouging head around its longitudinal axis L. The applied contact pressure may nevertheless be varied in order to optimize the cutting performance of the gouging head.

Suitably, the positioning system includes a further rotation stage 137b, to which the dissection tool 220 is coupled, enabling the angular position of the gouging head 225 to be adjusted around the longitudinal axis L, to select a desired gouging width.

Thus, when the tool is gouging material close to the boundary zone of the ROI, the controller 135 is suitably configured to select a rotational position of the head 225 that results in a narrow gouging zone, for precision removal of material. When less precision may be required, the head is rotated to a position that results in a wider gouging zone. The controller may also be configured to adjust the speed of the relative movement between the gouging head and the platform 110. The gouged tracks through the tissue sample may follow a straight path, a curved path or a mixture of the two, until all or substantially all of the gouged material has been removed from the slide.

In a further development, removal and collection of the gouged material is enhanced in that the dissection tool is connected to a vacuum pump 160 via e.g. an air tube, such than an airflow through the gouging head and tubular body of the dissection tool sucks the gouged tissue material into a downstream collection cavity. This helps ensure that no gouged material is lost and left on the slide.

Assuming that the material gouged from the slide is material to be used for molecular diagnosis, the material that is sucked into the collection cavity may be transferred to a sample tube by using a liquid or any other suitable method known to one of ordinary skill in the art. The liquid can be a lysis buffer.

In a still further embodiment of a dissection apparatus according to the presently disclosed subject matter, the dissection tool is mounted to the housing so as to be rotational about a rotation axis normal to the platform. Such an arrangement provides a further method of enabling the width of the gouging zone to be varied, which will be explained with reference to FIGS. 3a and 3b.

Figure 3A:
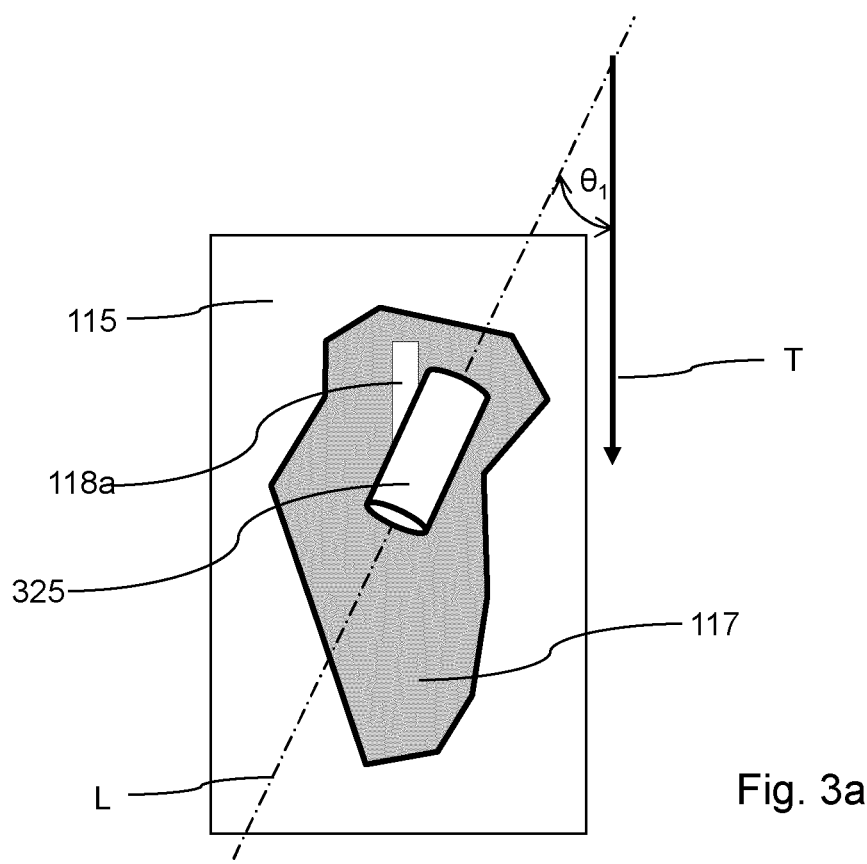
FIG. 3a shows a top view of a gouging head in a first position cutting a track through a tissue sample, for use in a still further embodiment of an apparatus according to the presently disclosed subject matter in which an angular orientation of the head relative to its direction of translation is adjustable.

FIG. 3a shows a top view of a gouging head for use in an apparatus according to this further embodiment, cutting a track 118a though a tissue sample 117 on a slide 115, due to translation of the gouging head 325 relative to the slide 115 in a direction T. When the longitudinal axis L of the gouging head is parallel to the direction of translation T, the width of the front face of the gouging head in contact with the tissue sample is at its maximum. By varying the angular orientation of the gouging head 325 relative to the translation direction T, it is possible to reduce the effective width of the front face and thus vary the width of the gouging zone.

In the example of FIG. 3a, the gouging head is a thin-walled tube with circular cross-section, which may be made of steel, steel foil or suitable polymer material. The gouging head 325 is shown in a first position, in which the longitudinal axis L is arranged at an angle $\theta_1$ relative to the direction of translation T. The track 118a that is cut through the tissue sample has a smaller width than the maximum gouging width obtained when $\theta = 0$, whereby the reduction in width is proportional to the angle $\theta_1$.

Figure 3B:
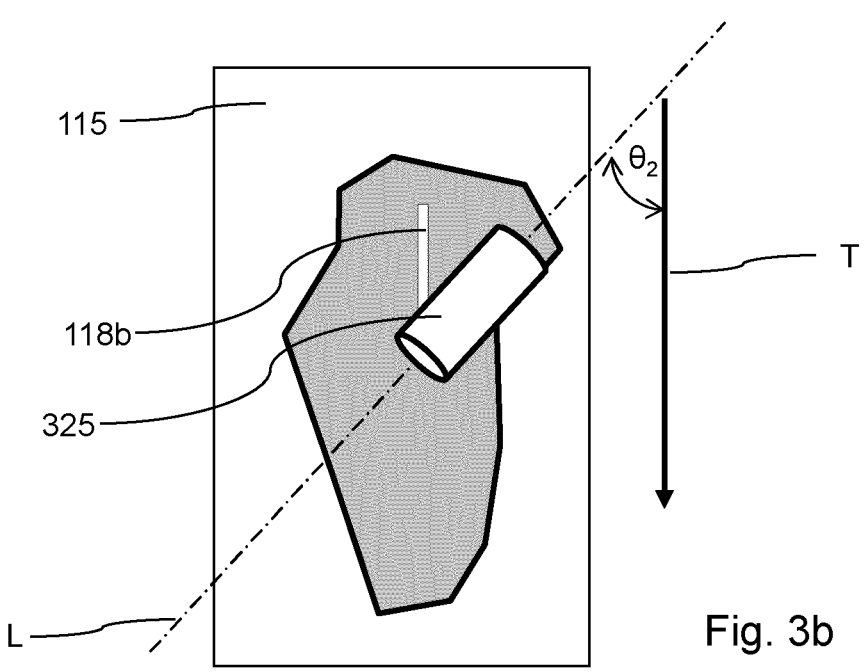
FIG. 3b shows a top view of the gouging head from FIG. 3a in second position.

When a narrower track width can be required, the positioning system is suitably configured to rotate the gouging head 325 about the rotation axis normal to the slide, to a second position as shown in FIG. 3b. In this position, the longitudinal axis L of the head and dissection tool is arranged at an angle $\theta_2$ relative to the direction of translation T, whereby $\theta_2 > \theta_1$. The track 118b that is cut through the tissue sample 117 during translation is narrower than the track 118a, whereby the reduction in width is proportional to the increase in angular orientation.

Suitably, the positioning system is equipped with motorized rotary actuator for enabling adjustment of the angular orientation of the gouging head relative to the translation direction and is programmed to control track width based on the shape of the region to be dissected, to enable effective and efficient removal of biological material.

Examples, embodiments or optional features, whether indicated as non-limiting or not, are not to be understood as limiting the presently disclosed subject matter as claimed. It should be noted that the above-mentioned embodiments illustrate rather than limit the presently disclosed subject matter, and that those of ordinary skill in the art will be able to design many alternative embodiments without departing from the scope of the appended claims.

In the claims, any reference signs placed between parentheses shall not be construed as limiting the claim. Use of the verb "include" and its conjugations does not exclude the presence of elements or steps other than those stated in a claim.

The article "a" or "an" preceding an element does not exclude the presence of a plurality of such elements. The presently disclosed subject matter may be implemented by means of hardware including several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

REFERENCE NUMERALS 100, 200 dissection apparatus
110 platform
115 slide
117 tissue sample
118a, 118b track cut through tissue sample by dissection tool
120, 220 dissection tool
122 body portion of dissection tool
125, 225, 325 gouging head of dissection tool
127a base portion of gouging head
127b, 127c opposing side portions of gouging head
128 cavity within gouging head
130 XY-stage of positioning system
132 Z-stage
135 controller of positioning system
137a rotation stage for adjusting angular position of platform relative to dissection tool around a rotation axis R normal to platform 137b rotation stage for adjusting angular position of gouging head around a longitudinal axis L of the dissection tool
140 imaging system
150 laser scoring device
160 vacuum pump
L longitudinal axis of dissection tool
α angle between platform surface and L
S material from tissue sample in region of interest (to be tested)
X material from tissue sample in unwanted area (not to be tested)
w, w' width of gouging zone and gouged track through tissue sample
$r_1$, $r_2$ radius of curvature of different portions of gouging head
T direction of translation of gouging head relative to the platform
$\theta_1$, $\theta_2$ angular orientation of gouging head relative to direction of translation T.

The invention claimed is:

1. An apparatus for dissection of material from a biological sample disposed on a planar substrate, the apparatus comprising:
   a dissection tool;
   a platform for supporting the planar substrate;
   a positioning system configured to move the dissection tool and the platform relative to each other and control their relative positions such that the dissection tool selectively engages with the biological sample in a predefined region thereof;
   wherein:
   the dissection tool has a longitudinal axis and is arranged at an oblique angle relative to the platform, and comprises a thin-walled gouging head having a base portion;
   the positioning system is further configured to bring an underside of the gouging head into contact with the planar substrate in use of the tool; and
   the gouging head further has opposing side portions which extend from the base portion in a direction away from the planar substrate and which at least partly enclose a cavity within the gouging head for receiving biological material that is dissected when relative movement between the gouging head and the planar substrate causes a front face of the gouging head to cut a track though the biological sample,
   wherein the positioning system includes a motorized rotary actuator coupled to the dissection tool and configured to:
   adjust an angular orientation of Rousing head relative to the translation direction about a rotation axis normal to the platform; and
   vary track width by adjusting the angular orientation of the gouging head between an angle $\theta=0$ degrees, in which the longitudinal axis of the dissection aligns with the translation direction and the track width is at its maximum, and an angle $\theta<90$ degrees and
   the apparatus further includes a suction device in connection with the gouging head.

2. The apparatus according to claim 1, wherein the positioning system comprises a linear actuator for varying a downward force applied on the gouging head and is configured to control a contact pressure between the gouging head and the planar substrate during dissection.

3. The apparatus according to claim 1, wherein an outer periphery of at least the base portion and opposing side portions of the gouging head is curved in circumferential direction relative to the longitudinal axis.

4. The apparatus according to claim 3, wherein the gouging head is formed by a thin-walled tube.

5. The apparatus according to claim 1, wherein the apparatus is configured to enable variation of a width of the track that is cut through the biological sample during dissection.

6. The apparatus according to claim 5, wherein an outer periphery of at least the base portion and opposing side portions of the gouging head is curved in circumferential direction relative to the longitudinal axis and wherein the apparatus is configured to enable portions of the gouging head having different curvatures so as to vary the track width.

7. The apparatus according to claim 6, wherein a first portion of the gouging head has a first radius of curvature $r_1$ and wherein at least one further portion of the gouging head has a second radius of curvature $r_2$, different from the first and wherein the dissection tool is mounted to the apparatus so as to be rotational about the longitudinal axis and the positioning system comprises means for adjusting an angular position of the gouging head such that the first portion or the at least one further portion may be used as the base portion of the gouging head.

8. The apparatus according to claim 6, wherein:
   the positioning system comprises a linear actuator for varying a downward force applied on the gouging head and is configured to control a contact pressure between the gouging head and the planar substrate during dissection;
   the gouging head is flexible; and
   the positioning system is configured to control the applied contact pressure between the gouging head and the planar substrate so as to deform the flexible gouging head, such that the radius of curvature of the base portion and opposing side portions can be varied.

9. The apparatus according to claim 1, wherein the oblique angle between the longitudinal axis of the dissection tool and the platform is between 30 and 60 degrees.

10. The apparatus according to claim 1, wherein the dissection tool is pivotably mounted to the apparatus for enabling adjustment of the oblique angle.

11. The apparatus according to claim 1, further comprising an imaging system for obtaining an image of the biological sample and identifying a boundary between a region of interest containing biological material to be tested and an unwanted area containing material not to be tested.

12. The apparatus according to claim 11, wherein the apparatus is configured to enable variation of a width of the track that is cut through the biological sample during dissection and the positioning system is configured to control:
   the relative position of the platform and the dissection tool; and
   the width of the track cut through the sample,
   based on the boundary identified by the imaging system, so as to cause the dissection tool to gouge several adjacent tracks though the biological sample.

* * * * *